United States Patent
Le et al.

(10) Patent No.: US 8,797,694 B2
(45) Date of Patent: Aug. 5, 2014

(54) MAGNETIC SENSOR HAVING HARD BIAS STRUCTURE FOR OPTIMIZED HARD BIAS FIELD AND HARD BIAS COERCIVITY

(75) Inventors: Quang Le, San Jose, CA (US); David J. Seagle, Morgan Hill, CA (US); Guangli Liu, Pleasanton, CA (US); Yongchul Ahn, San Jose, CA (US); Simon H. Liao, Fremont, CA (US)

(73) Assignee: HGST Netherlands B.V., Amsterdam (NL)

( * ) Notice: Subject to any disclaimer, the term of this patent is extended or adjusted under 35 U.S.C. 154(b) by 130 days.

(21) Appl. No.: 13/335,589

(22) Filed: Dec. 22, 2011

(65) Prior Publication Data

US 2013/0163121 A1    Jun. 27, 2013

(51) Int. Cl.
    G11B 5/39    (2006.01)
(52) U.S. Cl.
    USPC .................................................. 360/324.12
(58) Field of Classification Search
    CPC .............. G11B 5/3163; G11B 2005/3996; G11B 5/313; G11B 5/332; G11B 5/3903; G11B 5/3932; G11B 5/39
    USPC .................................................. 360/324.12
    See application file for complete search history.

(56) References Cited

U.S. PATENT DOCUMENTS

| | | | |
|---|---|---|---|
| 6,005,753 A | 12/1999 | Fontana, Jr. et al. | |
| 6,239,955 B1 * | 5/2001 | Dovek et al. | 360/321 |
| 6,426,853 B1 * | 7/2002 | Sakai et al. | 360/324.11 |
| 6,563,679 B1 * | 5/2003 | Li et al. | 360/324 |
| 6,765,767 B2 * | 7/2004 | Trindade et al. | 360/319 |
| 7,243,412 B2 | 7/2007 | Furukawa et al. | |
| 7,365,949 B2 | 4/2008 | Hayakawa et al. | |
| 7,548,400 B2 | 6/2009 | Kagami et al. | |
| 7,770,284 B2 | 8/2010 | Ohta et al. | |
| 7,813,086 B2 * | 10/2010 | Tanaka et al. | 360/324.1 |
| 8,289,644 B2 * | 10/2012 | Holmberg | 360/66 |
| 2002/0012209 A1 * | 1/2002 | Ajiki et al. | 360/327.3 |
| 2006/0007603 A1 | 1/2006 | Meguro et al. | |
| 2007/0217086 A1 | 9/2007 | Matsubara et al. | |
| 2008/0074800 A1 | 3/2008 | Kagami et al. | |
| 2009/0034126 A1 | 2/2009 | Pinarbasi | |
| 2009/0257153 A1 | 10/2009 | Liu | |
| 2010/0103562 A1 * | 4/2010 | Machita et al. | 360/313 |
| 2010/0142100 A1 | 6/2010 | Yoshida et al. | |
| 2010/0302688 A1 | 12/2010 | Shiimoto et al. | |
| 2011/0050211 A1 * | 3/2011 | Gao et al. | 324/207.21 |
| 2011/0051294 A1 * | 3/2011 | Gao et al. | 360/313 |
| 2011/0134564 A1 | 6/2011 | Yoshida et al. | |
| 2011/0215800 A1 * | 9/2011 | Zhou et al. | 324/252 |

FOREIGN PATENT DOCUMENTS

| | | | |
|---|---|---|---|
| JP | 2002367125 A | * | 12/2002 |
| JP | 2005/011449 A | | 1/2005 |
| JP | 2009026442 A | * | 2/2009 |
| JP | 2009/087506 A | | 4/2009 |

* cited by examiner

*Primary Examiner* — Will J Klimowicz
(74) *Attorney, Agent, or Firm* — Zilka-Kotab, PC

(57) ABSTRACT

A magnetic read sensor having a hard bias structure that extends beyond the back edge of the sensor stack by a controlled, distance that is chosen to maximize both hard bias field and hard bias magnetic coercivity and anisotropy. The hard bias structure has a back edge that is well defined and that has a square corner at its innermost end adjacent to the sensor stack. The magnetic sensor can be constructed by a process that includes a separate making an milling process that is dedicated to defining the back edge of the hard bias structure.

10 Claims, 30 Drawing Sheets

MAGNETIC SENSOR HAVING HARD BIAS STRUCTURE FOR OPTIMIZED HARD BIAS FIELD AND HARD BIAS COERCIVITY

FIELD OF THE INVENTION

The present invention relates to magnetic data recording and more particularly to a magnetic read head having a magnetic bias structure that provides increased free layer stability and reliability.

BACKGROUND OF THE INVENTION

The heart of a computer is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider into contact with the surface of the disk when the disk is not rotating, but when the disk rotates, air is swirled by the rotating disk. When the slider rides on the air bearing, the write and read heads are employed for writing magnetic impressions to and reading magnetic impressions from the rotating disk. The read and write heads are connected to processing circuitry that operates according to a computer program to implement the writing and reading functions.

The write head includes at least one coil, a write pole and one or more return poles. When a current flows through the coil, a resulting magnetic field causes a magnetic flux to flow through the write pole, which results in a magnetic write field emitting from the tip of the write pole. This magnetic field is sufficiently strong that it locally magnetizes a portion of the adjacent magnetic disk, thereby recording a bit of data. The write field, then, travels through a magnetically soft underlayer of the magnetic medium to return to the return pole of the write head.

A magnetoresistive sensor such as a Giant Magnetoresistive (GMR) sensor, or a Tunnel Junction Magnetoresistive (TMR) sensor can be employed to read a magnetic signal from the magnetic media. The sensor includes a nonmagnetic conductive layer (if the sensor is a GMR sensor) or a thin nonmagnetic, electrically insulating barrier layer (if the sensor is a TMR sensor) sandwiched between first and second ferromagnetic layers, hereinafter referred to as a pinned layer and a free layer. Magnetic shields are positioned above and below the sensor stack and can also serve as first and second electrical leads so that the electrical current travels perpendicularly to the plane of the free layer, spacer layer and pinned layer (current perpendicular to the plane (CPP) mode of operation). The magnetization direction of the pinned layer is pinned perpendicular to the air bearing surface (ABS) and the magnetization direction of the free layer is located parallel to the ABS, but free to rotate in response to external magnetic fields. The magnetization of the pinned layer is typically pinned by exchange coupling with an antiferromagnetic layer.

When the magnetizations of the pinned and free layers are parallel with respect to one another, scattering of the conduction electrons is minimized and when the magnetizations of the pinned and free layer are antiparallel, scattering is maximized. In a read mode the resistance of the spin valve sensor changes about linearly with the magnitudes of the magnetic fields from the rotating disk. When a sense current is conducted through the spin valve sensor, resistance changes cause potential changes that are detected and processed as playback signals.

As magnetoresistive sensors become ever smaller in an effort to maximize data density the biasing of the free layers becomes ever more challenging. The smaller the free layer becomes, the more inherently unstable its magnetization becomes, and the smaller the bias structure is the weaker the bias field is. Therefore, there remains need for a structure that can provide a sufficiently strong bias field as well as hard bias coercivity in order to ensure both free layer stability and reliability.

SUMMARY OF THE INVENTION

The present invention provides a magnetic read sensor that includes a sensor stack having an edge disposed at an air bearing surface and a free layer back edge opposite the air bearing surface, the distance between the front edge and the free layer back edge defining a sensor stack stripe height. The read sensor has a hard bias structure formed adjacent to the sensor that has a back edge opposite the air bearing surface. The distance between the air bearing surface and the back edge of the hard bias structure defines a hard bias length, the hard bias length being equal or greater than the sensor stripe height.

The magnetic sensor can be constructed by a process that includes performing a first masking and ion milling process to define a stripe height of the sensor (partial mill defining back edge of the free layer or full mill defining back edge of free and pinned layers), then performing a second masking and ion milling process to define the track width of the sensor, and then performing a third masking and milling process to define the back edge of the hard bias structure (as well as the back edge of the pinned layer if a partial mill was performed in the first ion milling).

The use of the separate, third masking and milling process allows the length of the hard bias structure (as measured from the ABS to the back edge) to be controlled so as to optimize both hard bias field and hard bias coercivity and anisotropy. In addition, after performing the first masking and milling process a novel bi-layer or tri-layer fill material is deposited that includes a first insulation layer constructed of a material such as SiN or TaOx and a second layer of material such as AlOx deposited over the first insulation layer. For tri-layer, the third insulation layer is constructed of a material such as SiN or TaOx. There can be various combination of the layers, but in general the AlOx layer is thin and functions as a material with high breakdown voltage to prevent shunting, whereas the SiN or TaOx functions as a high mill rate material that has a mill rate that is substantially the same as that of the sensor material and that acts as a diffusion barrier to protect the sensor. In this way, the exposed insulation materials from the first mill can be completely removed during the track width defining ion milling, leaving minimal topography and space for the hard bias material to extend beyond the back edge of the sensor.

Two sensor designs are possible, the first having an extended pinned layer structure, and the second having a pinned layer with the same stripe height as the free layer. In the first design a first, stripe height defining ion milling is terminated at the barrier layer, leaving the pinned layer extending beyond the stripe height of the free layer. A novel bi-layer or tri-layer fill layer is deposited wherein one of the fill layers is a material such as SiN or TaOx and the other fill layer is aluminum oxide. In the second design, full mill is used to define the stripe height of the sensor so the pinned layer has the same stripe height as the free layer. In this case a bi-layer or tri-layer fill can be used and be materials such as SiN or TaOx for the first layer, AlOx, SiN or TaOx for the second layer, and AlOx, SiN or TaOx or their combination for the third layer. These can be used to ensure the exposed area is completely removed during the track width defining ion milling leaving space for the hard bias material.

These and other features and advantages of the invention will be apparent upon reading of the following detailed description of preferred embodiments taken in conjunction with the Figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

DETAILED DESCRIPTION OF THE PREFERRED EMBODIMENTS

The following description is of the best embodiments presently contemplated for carrying out this invention. This description is made for the purpose of illustrating the general principles of this invention and is not meant to limit the inventive concepts claimed herein.

Figure 1:
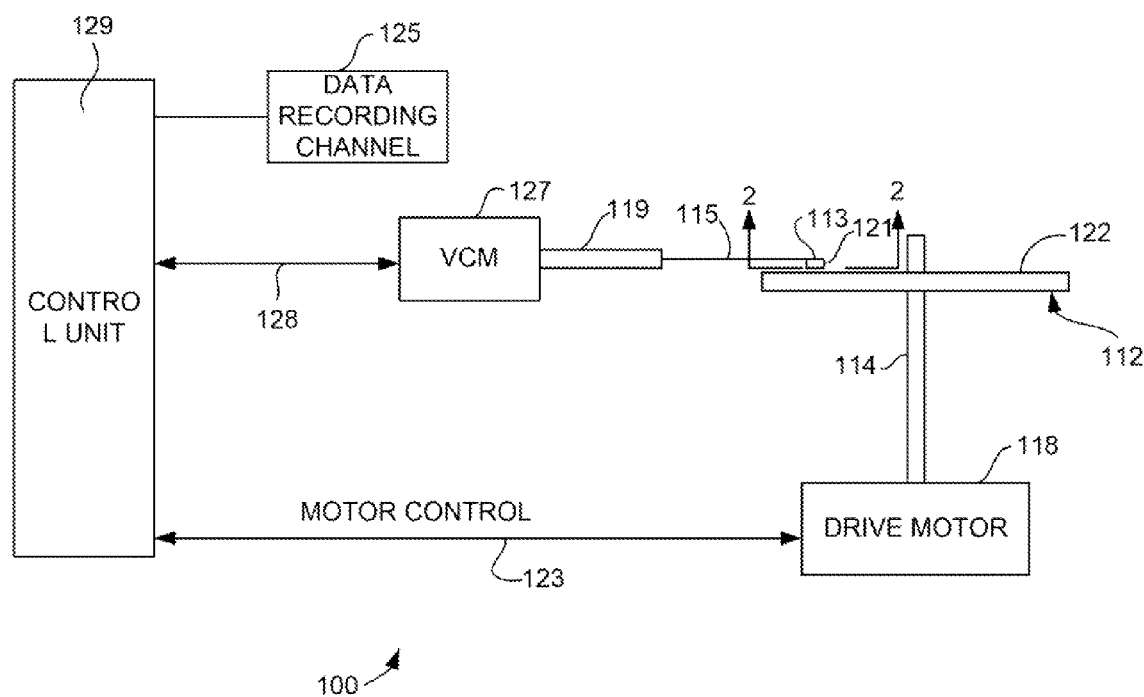
FIG. 1 is a schematic illustration of a disk drive system in which the invention might be embodied.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves radially in and out over the disk surface 122 so that the magnetic head assembly 121 can access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
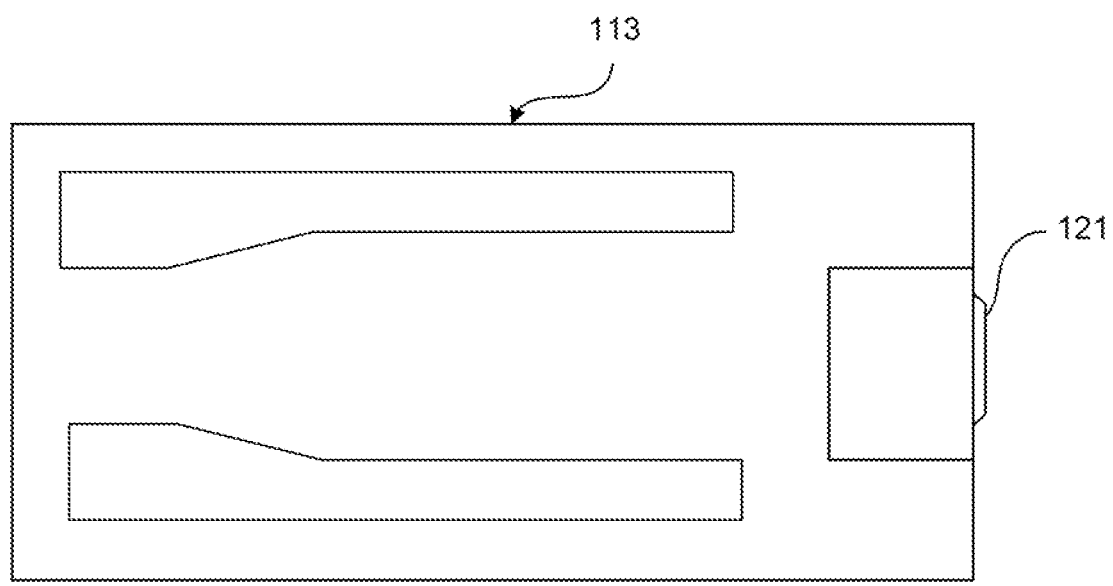
FIG. 2 is an ABS view of a slider illustrating the location of a magnetic head thereon.

With reference to FIG. 2, the orientation of the magnetic head 121 in a slider 113 can be seen in more detail. FIG. 2 is an ABS view of the slider 113, and as can be seen the magnetic head including an inductive write head and a read sensor, is located at a trailing edge of the slider. The above description of a typical magnetic disk storage system and the accompanying illustration of FIG. 1 are for representation purposes only. It should be apparent that disk storage systems may contain a large number of disks and actuators, and each actuator may support a number of sliders.

Figure 3:
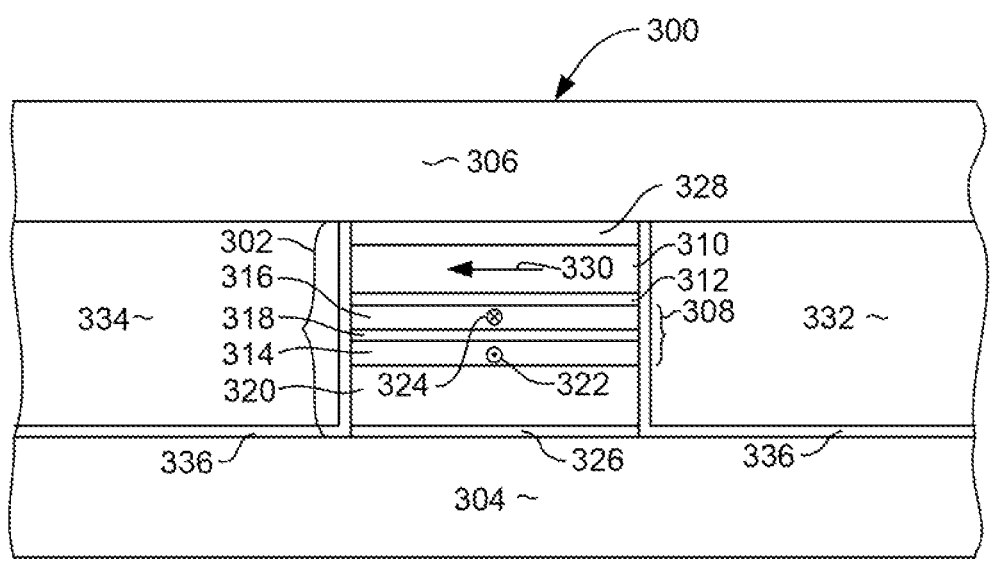
FIG. 3 is an enlarged ABS view of a magnetoresistive according to an embodiment of the invention.

FIG. 3 shows a magnetic read head 300 having a sensor stack 302 that is sandwiched between first and second magnetic shields 304, 306. The magnetic shields 304, 306 can be constructed of an electrically conductive, magnetic material such as NiFe so that they can function as electrical leads for supplying a sense current to the sensor stack 302 as well as functioning as magnetic shields. The sensor stack can include a magnetic pinned layer structure 308, a magnetic free layer 310 and a non-magnetic barrier or spacer layer 312 sandwiched there-between. The sensor stack 302 can also include a seed layer 326 at its bottom, which can be provided to ensure a desired grain structure formation in the above deposited layers. The sensor stack 302 can also include a capping layer 328 at its top to protect the under-lying layers from damage during manufacture. The capping layer 328 can be, for example, Ru or Ru/Ta/Ru.

The pinned layer structure can include first and second magnetic layers 314, 316 that are anti-parallel coupled across a non-magnetic antiparallel coupling layer 318 such as Ru sandwiched there-between. The first magnetic layer 314 can be exchange coupled with a layer of antiferromagnetic material (AFM layer) 320, which can be constructed of a material such as IrMn or PtMn. This exchange coupling strongly pins the magnetization of first magnetic layer 310 in a first direction perpendicular to the ABS as indicated by arrowhead symbol 322. Anti-parallel coupling between the magnetic layers 314, 316 pins the magnetization of the second magnetic layer 316 in a second direction that is anti-parallel with the first direction and perpendicular to the ABS as indicated by arrow-tail symbol 324.

The free layer 310 has a magnetization that is biased in a direction that is generally parallel with the ABS as indicated by arrow 330. Although the magnetization 330 is biased in this direction, it is free to move in response to an external magnetic field, such as from a magnetic medium.

The biasing of the magnetization 330 is achieved by a magnetic bias field from hard magnetic bias layers 332, 334. These magnetic bias layers 332, 334 are permanent magnets formed of a high coercivity magnetic material such as CoPt, or CoPtCr. The bias layers 332, 334 are separated from the sensor stack 302 and from at least the bottom shield 304 by thin, non-magnetic, electrically insulating layers such as alumina 336, 338.

Figure 4:
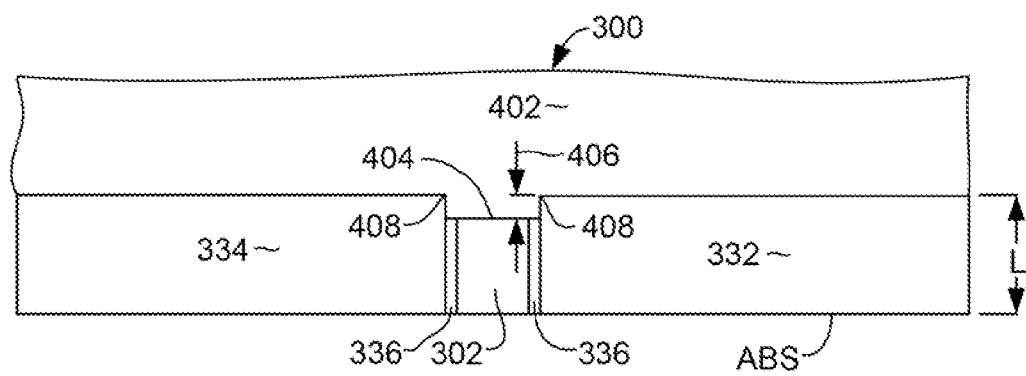
FIG. 4 is a top down view of the sensor of FIG. 3. Showing a hard bias structure.

As discussed above, as sensors become ever smaller, the biasing of the magnetization 330 of the free layer 310 becomes ever more difficult. The magnetic bias layers 332, 334 of the present invention have a configuration that maximizes the available magnetic bias field while also ensuring manufacturability without damage to the sensor. FIG. 4 shows a top down view of the structure of FIG. 3. As can be seen, the sensor stack extends from the air bearing surface (ABS) to a back edge 404. As can be seen, the sensor stack extends from the air bearing surface (ABS) to a back edge 404 opposite the ABS that defines the stripe height of the sensors stack 302. The area behind the sensor stack 302 and hard bias layers 332, 334 can be filled with a non-magnetic, electrically insulating fill material 402 such as alumina.

As discussed above, the free layer 310 has a magnetization 330 that is biased by a magnetic field from the hard bias layer structures 332, 334. As sensors become smaller in order to increase data density the magnetization of the free becomes inherently more unstable and it becomes more difficult to provide a strong enough magnetic field to bias the free layer. Traditionally, sensor have been constructed such that the magnetic bias layers have the same stripe height as the sensor stack so that the bias structures have a back edge that terminates at the same location as that back edge of the sensor. This is because sensors have been traditionally constructed by a process wherein the track width of the sensor is defined first by making and ion milling, and then the stripe height is subsequently formed by another making and ion milling process. The stripe height of the sensor and length of the hard bias structure (measured from the ABS) are defined in the same masking and ion milling process. When the hard bias layers are constructed in this manner they are formed so that they are short in the stripe height direction and long in the lateral direction parallel with the ABS and perpendicular to the data track direction. This shape provides a magnetic anisotropy in a direction parallel with the ABS, which provides good hard bias stability. However it provides less than optimal hard bias field. Therefore, the hard bias field available for biasing the free layer is not as great as it could be and free layer stability suffers.

Conversely, a sensor could also be constructed by a process wherein the sensor stripe height is defined first by masking and ion milling, and then the track width is defined by a second masking and ion milling process. In this case, the hard bias layers (which are formed after the stripe height and track width are defined) extend far beyond the back edge of the sensor stack, and the back edge of the hard bias layer has a rounded edge. The reason for the hard bias structure having such as shape will clearer below where a method for manufacturing a sensor is discussed. With such a hard bias shape, the hard bias field is increased, however the magnetic anisotropy and coercivity of the hard bias structures suffers. Reduced hard bias anisotropy and coercivity leads to poor sensor reliability, since the reduced anisotropy and coercivity can allow the hard bias magnetization be lost altogether or to flip direction.

The present invention overcomes the problems associated with both of these sensor constructions to provide a hard bias structure 332, 334 that optimizes both the hard bias field as well as the magnetic anisotropy and coercivity. As can be seen in FIG. 4, the hard bias layers 332, 334 each have a length L as measured from the ABS to their back edges and extend beyond the back edge 404 of the sensor by a distance 406.

This distance 406 can be controlled by a process described below in order to optimize hard bias field, magnetic anisotropy and coercivity.

Ideally, the hard bias extension distance 406 is 0-250 nm as measured from the back edge of the sensor stack 302. In addition to having an optimal extension distance 406, the bias structures 332, 334 also each have a square corner 408 at the junction of the inner sides and back edge of the hard bias structures 332, 334. As will be better understood below upon after discussing a method for manufacturing a magnetic read head, prior art read sensors constructed by a process that first defines the stripe height and then defines the track width have hard bias structures that not only extend far beyond the back edge of the sensor stack but also have poorly defined rounded back edges. By contrast, the sensor of the present invention has well defined hard bias structures with a back edge that extends to a well defined distance 406 from the back edge of the sensor stack 302 and also has a back edge that forms a well defined inner corner 408 at the innermost edge of the sensor stack. These features, which optimize both hard bias field and also magnetic anisotropy and coercivity of the hard bias structures 332, 334 can be produced by a process that will be described herein below.

Figure 5:
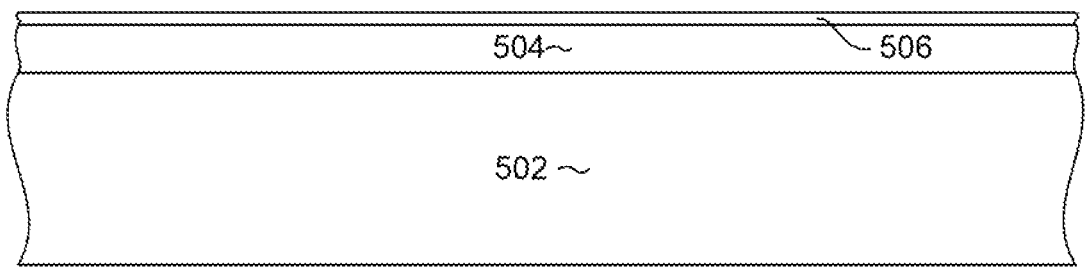
FIGS. 5-30 are views of a magnetic read head in various intermediate stages of manufacture illustrating a method for manufacturing a magnetic read head according to an embodiment of the invention.

FIGS. 5-21 show a magnetic read sensor in various intermediate stages of manufacture in order to illustrate a method of manufacturing a magnetic read sensor according to an embodiment of the invention. With particular reference to FIG. 5, a bottom magnetic shield 502 is formed. The bottom shield can be constructed of an electrically conductive magnetic material such as NiFe, CoFe etc. so that it can function as a bottom lead as well as a bottom shield. The shield 502 can be embedded in an electrically insulating, non-magnetic fill material (not shown in FIG. 5), and the surface of both of these can be planarized by a process such as chemical mechanical polishing (CMP).

A plurality of sensor layers, referred to collectively as sensor layers 504 in FIG. 5, are deposited over the bottom shield 502. These layers, which are deposited full film, can include the various layers of the sensor stack 302 described above with reference to FIG. 3, although they can include other materials for various other magnetic sensor configurations as well. The sensor layers 504 can be deposited by sputter deposition, ion beam deposition or some other suitable material deposition process. A layer of material that is resistant to chemical mechanical polishing (CMP stop layer) 506 can be deposited over the sensor material 504. The CMP stop layer 506 can be constructed of a material such as diamond like carbon (DLC), amorphous carbon.

Figure 6:
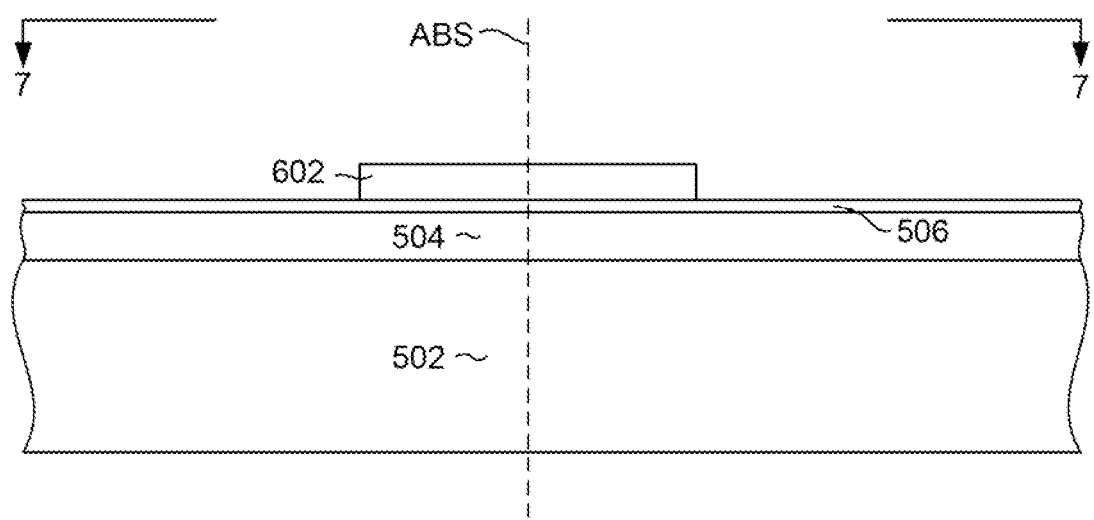
Figure 7:
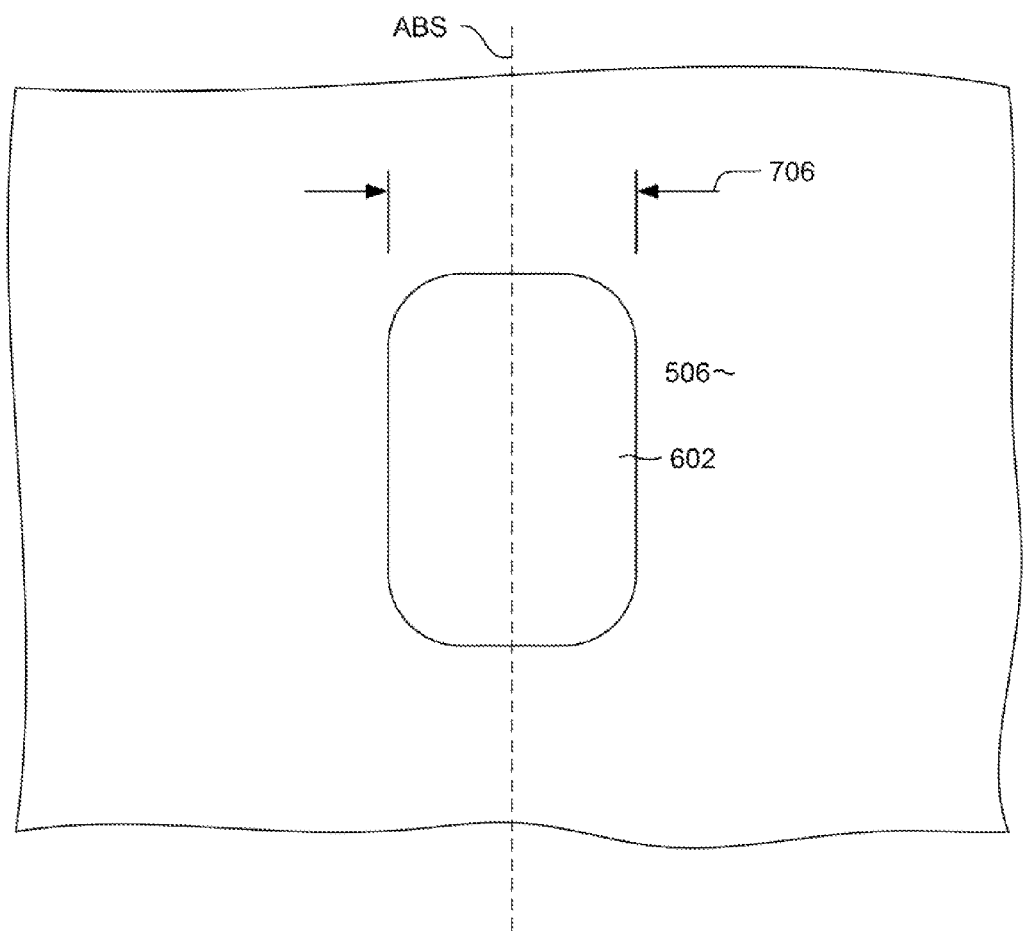

With reference now to FIG. 6, a first mask structure 602 is formed over the sensor layers 504 and CMP stop layer 602. The first mask structure 602 can include a photoresist layer that has been photolithographically patterned and can also include an image transfer layer such as DURIMIDE® or some other suitable material. The mask 602 can also include other layers such as one or more hard mask layers. The first mask 602 is configured to define a stripe height of a sensor. In FIG. 6, the orientation of the air bearing surface plane (which will be subsequently defined by a lapping operation) is indicated by the dashed line denoted "ABS" in FIG. 6. FIG. 7 shows a top down view as seen from line 7-7 of FIG. 6 and better illustrates the configuration of the mask. As can be seen, the mask 602 has edges that are located at opposite sides of the air bearing surface plane ABS and define a covered portion 706 there-between. The mask 602 defines the stripe height of the sensor by defining the back edge of the sensor, as will be seen.

Figure 8:
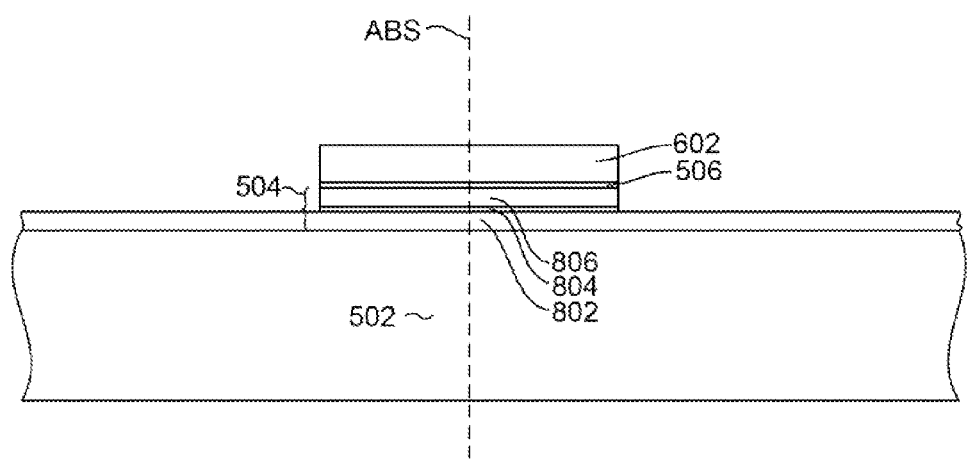

After the mask has been formed, an ion milling process is performed to remove a portion of the sensor material 504 and CMP stop layer 506 that is not protected by the mask 602, leaving a structure such as shown in FIG. 8. There are two ways in which this ion milling can be performed. The ion milling can be a full ion milling wherein all of the unprotected sensor material 504 is removed or can be a partial ion milling where only a portion of the sensor material 504 is removed. FIG. 8 shows the sensor layers having a pinned layer structure 802, a barrier or spacer layer 804 and a free layer and capping layer 806 over the barrier/spacer layer 804. In the partial mill designed shown in FIG. 8, the ion milling is performed sufficiently to remove the free layer 806, but stops at the barrier layer 804, leaving the pinned layer structure 802 extending beyond the back edge of the free layer 806. Therefore, the back edge of the free layer 806 defines the active area of the sensor (the actual stripe height of the sensor), whereas the pinned layer extends beyond the active area. If a full mill design (not shown in FIG. 8) were to be performed, the pinned layer 802 would extend to the same back edge as the free layer 806.

Figure 9:
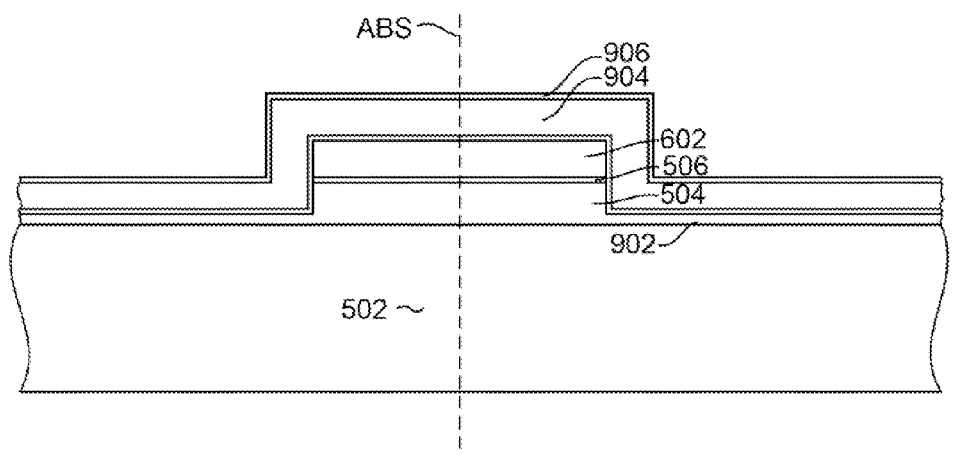

Then, with reference to FIG. 9, a bi-layer, dielectric, non-magnetic fill layer and CMP stop layer are deposited. The bi-layer, dielectric, non-magnetic fill layer includes a relatively thin layer 902 of a non-magnetic, dielectric material that is deposited by a conformal deposition process such as atomic layer deposition (ALD). The first layer 902 is chosen to be a material that is removed by ion milling at about the same rate as the sensor layers 504 and is preferably SiN or TaOx or both. The second layer 904 of the bi-layer fill is a non-magnetic, dielectric material that is somewhat resistant to ion milling and is preferably AlOx. This will be advantageous for reasons that will become apparent below. To this end, the layer 904 is preferably alumina ($Al_2O_3$) and is preferably deposited by a conformal deposition process such as atomic layer deposition (ALD) or ion beam deposition (IBD). The layer 904 is preferably deposited thick enough to provide high breakdown voltage and the other insulation made thick enough so that the combined layers thickness is about level with the top of the sensor layers 504.

If a full mill had been performed as discussed above, then an additional third fill layer can be deposited leaving a tri-layer fill. This third layer can be SiN, TaOx or a combination of these material.

A CMP stop layer 906 is deposited over the layers 902, 904 (as well as the third fill layer if present). The CMP stop layer 906 is a material that is resistant to removal by chemical mechanical polishing (CMP) such as diamond like carbon (DLC) or amorphous carbon, and is also preferably deposited by a conformal deposition process such as ion beam deposition (IBD).

Figure 10:
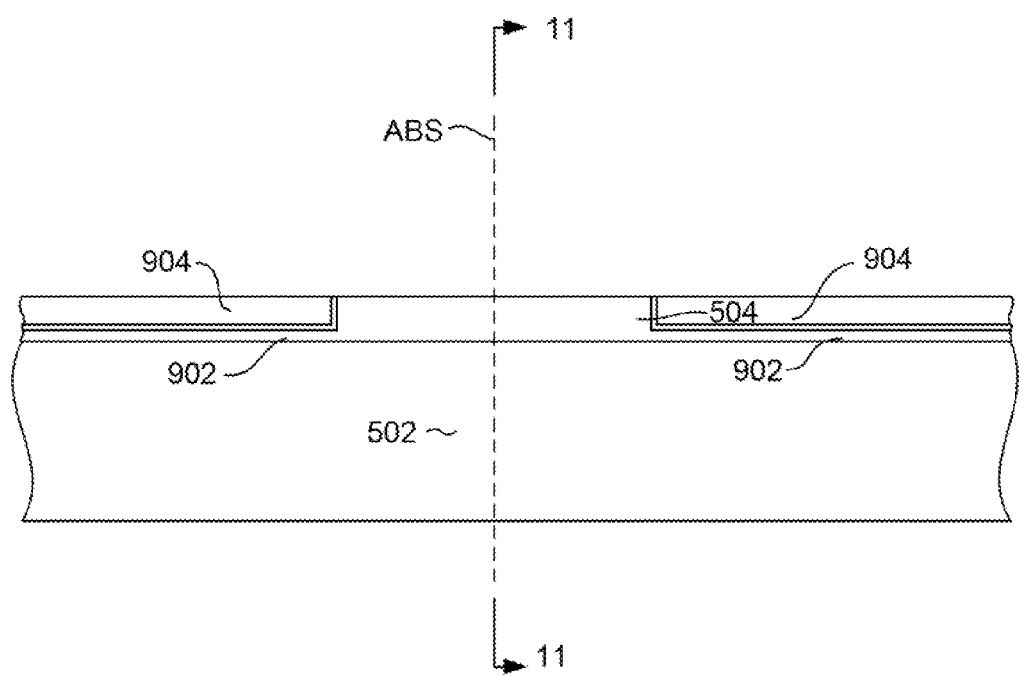

After the layers 902, 904, 906 have been deposited, a chemical mechanical polishing process is performed to planarize the structure. The chemical mechanical polishing process can be used to remove all or a portion of the mask 602, and another process such as chemical liftoff can also be used to remove any remaining mask 602. A reactive ion etching (RIE) can then be used to remove any remaining CMP stop layer. This leaves a structure such as that shown in FIG. 10. As seen in FIG. 10, the above CMP and RIE processes form the layers 902, 904, 504 with coplanar upper surfaces. [FIG. 10 is wrong]

Figure 11:
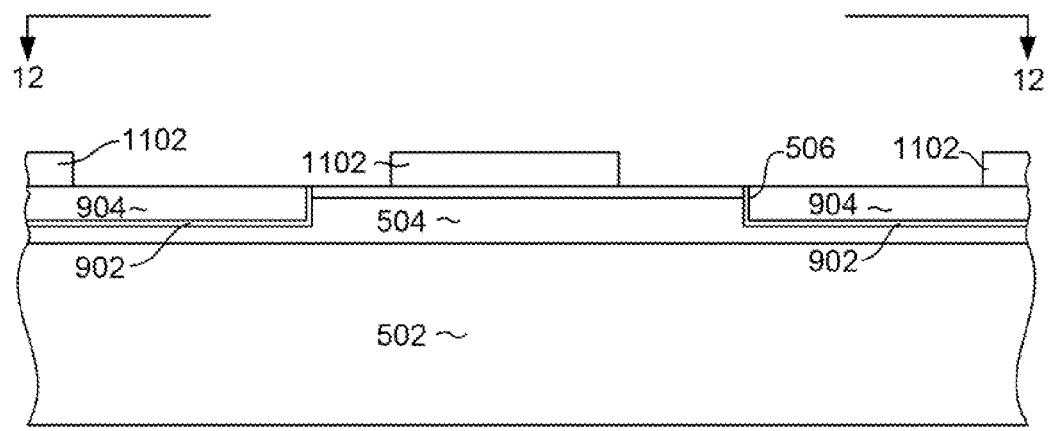
Figure 12:
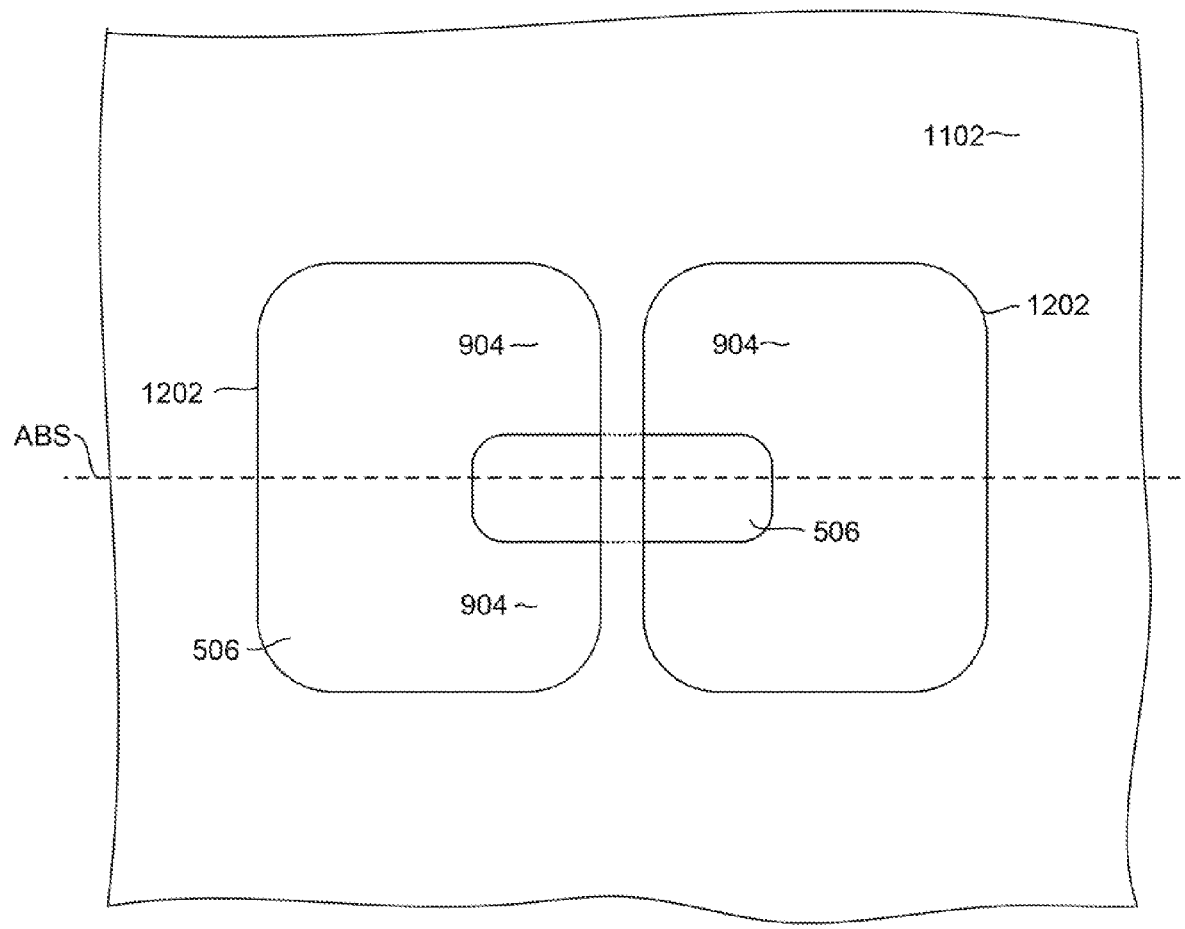

With reference now to FIGS. 11 and 12, another (second) mask structure 1102 is formed over the sensor layers 504, and CMP stop layer 506. FIG. 11 shows a side, cross sectional view and FIG. 12 shows a top-down view as seen from line 12-12 of FIG. 11. This mask 1102 is configured to define the track width of the sensor, which can be better seen in FIG. 12. The mask 1102 has openings 1204 that extend across the air bearing surface plane (ABS). The openings 1202 define a covered portion 1204 there-between that is configured to define the track-width of the sensor. As with the previously formed mask 602 (FIG. 7), the openings 1202 formed in this mask 1102 have rounded corners. In FIG. 12 the previously formed fill layers 904 can be seen, and portions of the fill layer 904 that extend beneath the mask 1102 are shown in dashed line to indicate that they are hidden beneath the mask 1102.

Figure 13:
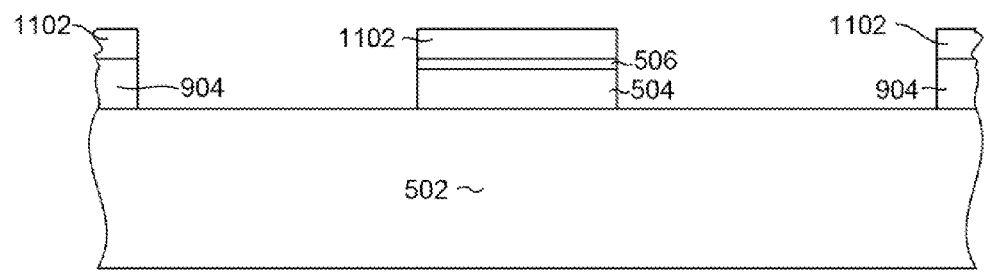

With reference now to FIG. 13 which shows a side cross section similar to FIG. 11 an ion milling process is performed to remove portions of the sensor material 504 and CMP stop layer 506 that are not protected by the mask 1102. Referring back to FIG. 12, however it can be seen that a portion of the fill layer 904 is also exposed through the opening. Therefore, the ion milling also removes portions of this material that are exposed through the openings as well. It will be recalled that, as discussed above with reference to FIG. 9, the fill layer 904 is constructed of a material (e.g. SiN or TaOx or both) that has an ion mill rate that is substantially the same as the sensor layer material 504, whereas the underlying layer 902 is constructed of a material (e.g. AlOx) that is more resistant to removal by ion milling. Therefore, the ion milling that removes the sensor material 504 to define the track width will also remove substantially all of the exposed portion of the fill layer 504, but will leave the underlying layer 502 substantially intact in these exposed regions. The relevance of this to the present invention will discussed in further detail herein below.

Figure 14:
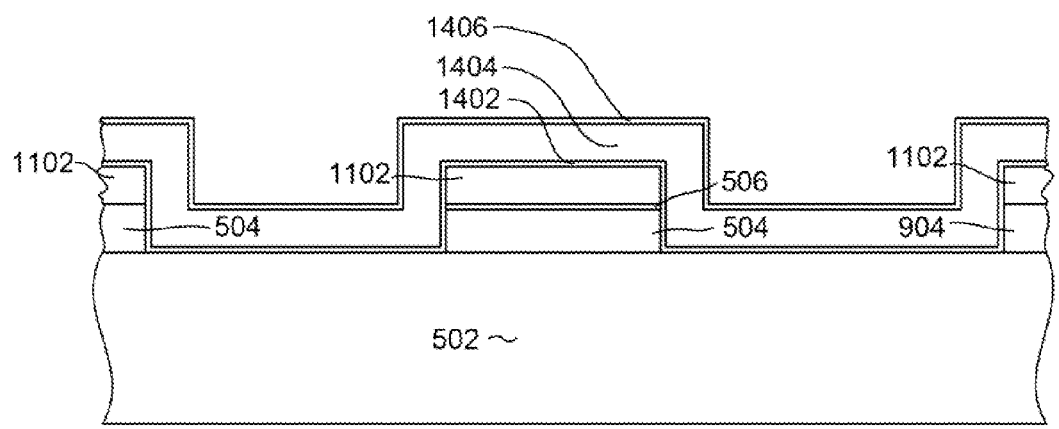

With reference now to FIG. 14, a thin layer of non-magnetic, electrically insulating material 1402 is deposited, followed by hard bias material 1404 and a third CMP stop layer 1406. The insulation layer is preferably constructed of alumina ($Al_2O_3$) and is preferably deposited by a conformal deposition process such as atomic layer deposition (ALD). This layer is also preferably deposited as thin as practical without risking voids or defects at the sides of the sensor layers 504 that might lead to current shunting in the finished read head. The magnetic bias layer 1404 may actually include multiple layers such as one or more seed layers, such as NiTa, Cr or CrMo, as well as layer of high coercivity magnetic material such as CoPt or CoPtCr. The layer 1404 may also include a capping layer formed over the high covercivity magnetic material. The hard bias material layer 1404 is preferably deposited to a thickness about equal to the height of the top of the sensor material 504. The CMP stop layer 1406 is constructed of a material that is resistant to chemical mechanical polishing, such as diamond like carbon (DLC) or amorphous carbon and is deposited just thick enough to withstand a chemical mechanical polishing process that will be used to planarize the structure and remove the mask layer 1102.

After the layers 1402, 1404, 1406 have been deposited, another chemical mechanical polishing is performed to planarize the structure and remove all or most of the mask 1102. Any mask material 1102 remaining after the CMP can be removed by a process such as chemical liftoff. This leaves structure as shown in FIG. 15, wherein the hard bias layers 1404 and sensor layers 504 have coplanar upper surfaces.

Figure 15:
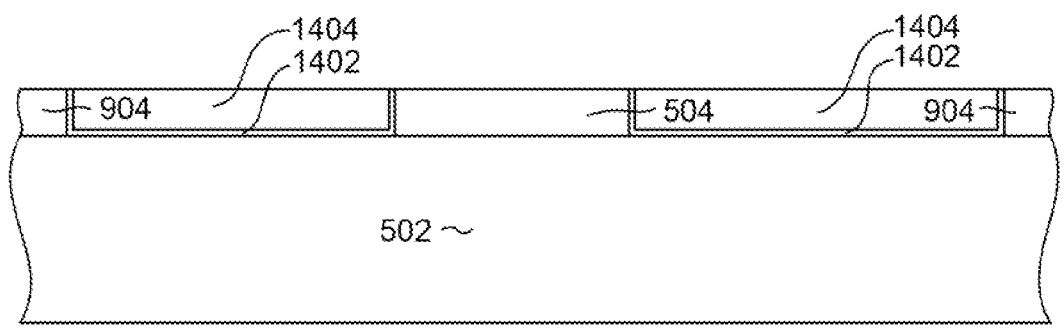
Figure 16:
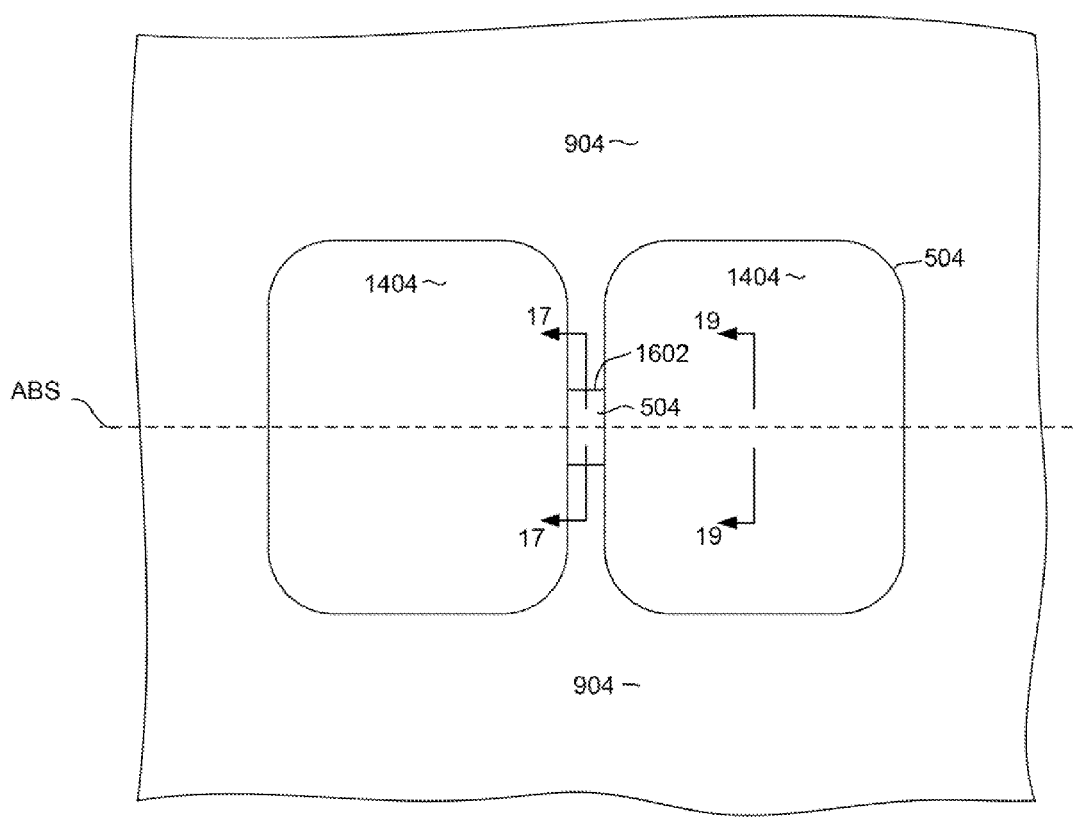

FIG. 16 shows a top down view of the structure of FIG. 15 as seen from line 16-16 of FIG. 15. This is a top down view after both the track width and stripe height of the sensor 504 have been defined. As can be seen, the hard bias structures 1404 extend far beyond the back edge 1602 of the sensor 504. Also, it can be seen that the back edge of the hard bias layers 1404 has a rounded corner with a large radius of curvature.

This is a result of the inability of photoresist masks to be patterned with sharp corners, as discussed above.

Figure 17:
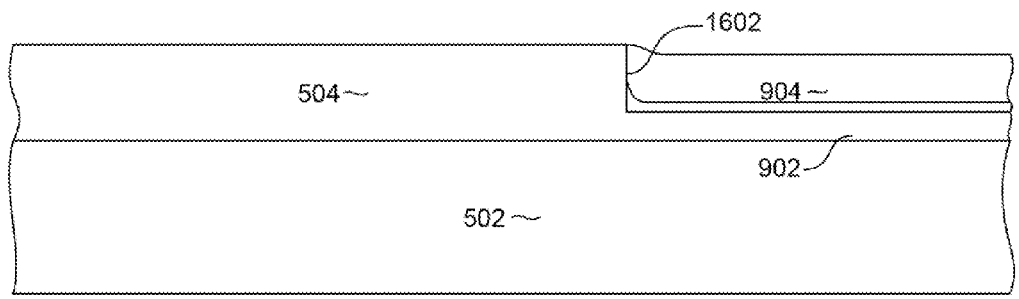
Figure 19:
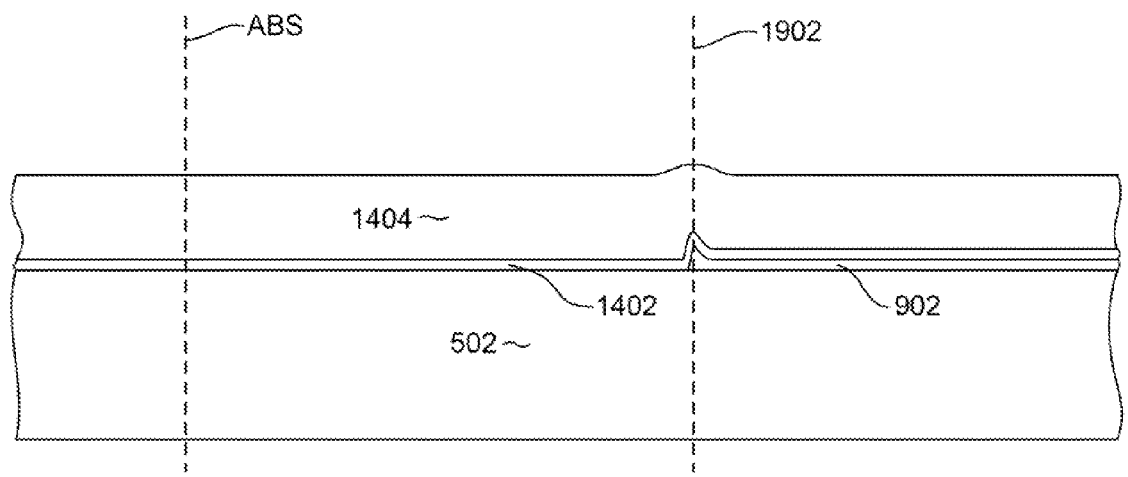

FIG. 17 is a side cross sectional view (at the location of the sensor 504) as seen from line 17-17 of FIG. 16, and FIG. 19 is a side cross sectional view FIG. 17 shows the back edge 1602 of the sensor 504, and shows that the insulation fill layers behind the sensor include the underlying layer 902 (e.g. SiNx, TaOx SiOx, or SiOxNy) and the thicker fill layer 904 (e.g. alumina). It can also be seen in FIG. 17 that a portion of the sensor (the pinned layer structure 802 FIG. 8) extends beyond the rest of the sensor material 504. In this case the bi-layer fill (902, 904) is used. However, the sensor were a full mill design having no tail portion extending beyond the rest of the sensor 504, then a third layer of fill material (not shown) would be included along with the layers 902, 904 as discussed above.

Figure 18:
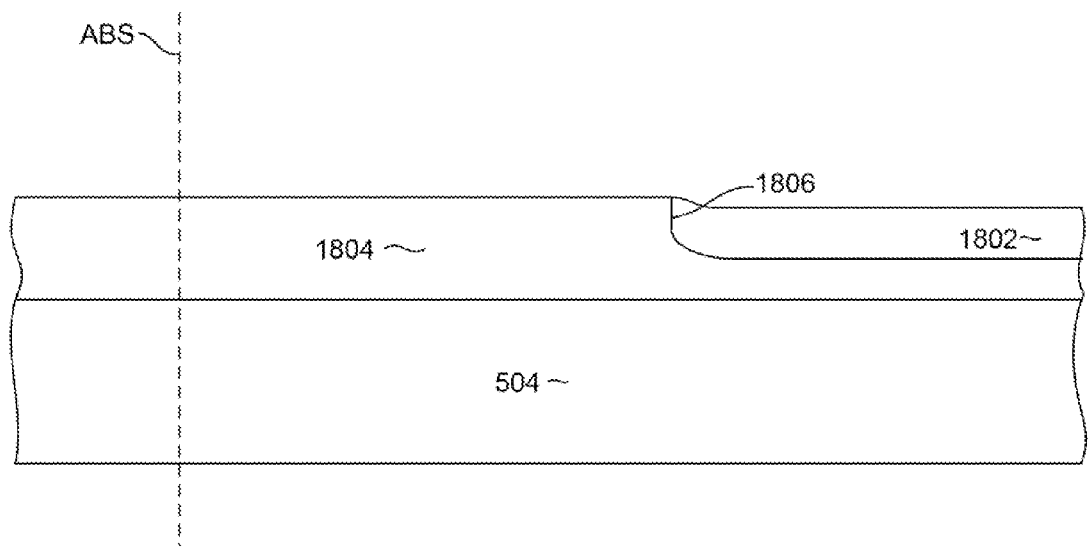

FIG. 18 shows that back edge of a sensor formed without the advantage of this novel bi-layer fill. In FIG. 18 it can be seen that there is only one fill layer 1802 and that the sensor 1804 has a poorly defined back edge 1806 with a tail that extends beyond the intended location of the back edge.

FIG. 19 shows a side cross sectional view (in the region of the hard bias 1404 away from the sensor 504) as seen from line 19-19 of FIG. 16. In FIG. 19 the dashed line ABS denotes the location of the intended air bearing surface plane, and the dashed line 1902 denotes a location aligned with the back edge 1806 of the sensor 504 (FIG. 17). It can be seen in FIG. 19, that the thin first fill layer 902 remains in the region beyond the line 1902. However, as discussed above, this layer is very thin, as the majority of the fill layer was constructed of a material 904 that had an ion mill rate that about the same as that of the material of the sensor and was, therefore, removed in the track-width defining ion milling. In addition, the thin hard bias insulation layer 1402 remains both in front of and behind the line 1902. However, because these layers 902, 1402 are very thin, the hard bias layer 1404 extends beyond the line 1902 with thickness of the hard bias layer beyond the line 1902 being about the same as its thickness in front of the line 1902.

Figure 20:
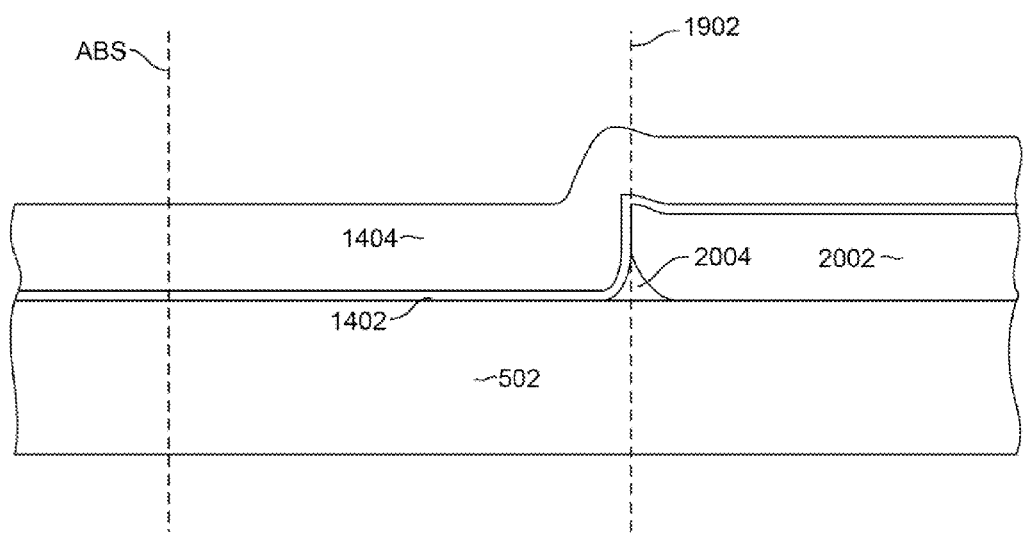

This can be compared with a sensor constructed by a prior art process, as shown in FIG. 20, wherein the fill layer uses a fill layer that is not matched with the ion mill rate of the sensor material. Using such a fill, a majority of the fill layer 2002 remains after the track width of the sensor has been defined. In addition, a significant amount of sensor tail 2004 remains at the location of the line 1902. Because a large amount of fill material 2002 remains in the region beyond the line 1902, the hard bias layer must extend over this thick layer 2002. After planarization (such as by CMP), there will be very little hard bias material beyond the line 1902. The present invention (as shown in FIG. 19) therefore, advantageously allows the hard bias material to extend beyond the line 1902 to provide an extended hard bias structure of the present invention.

Figure 21:
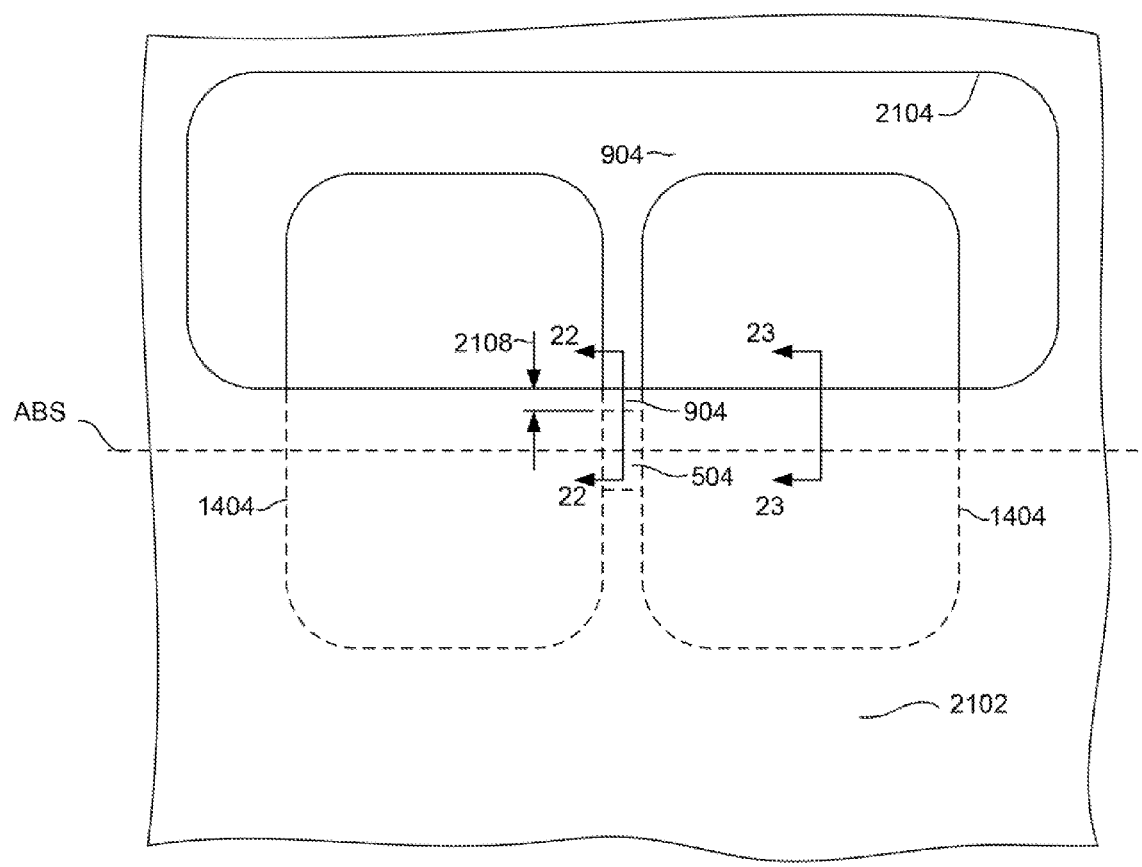
Figure 22:
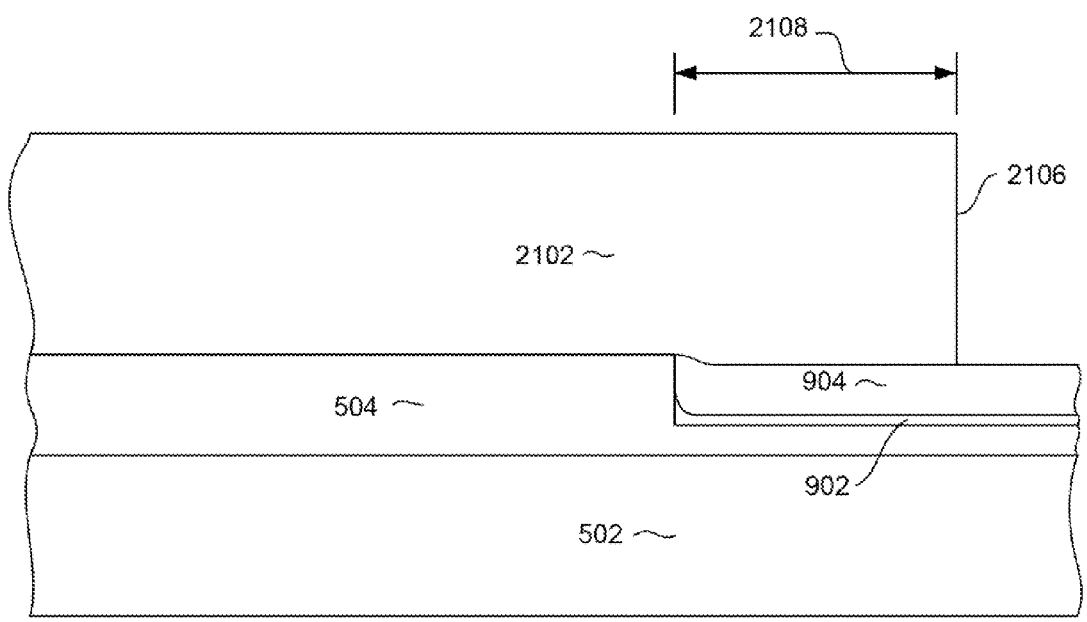
Figure 23:
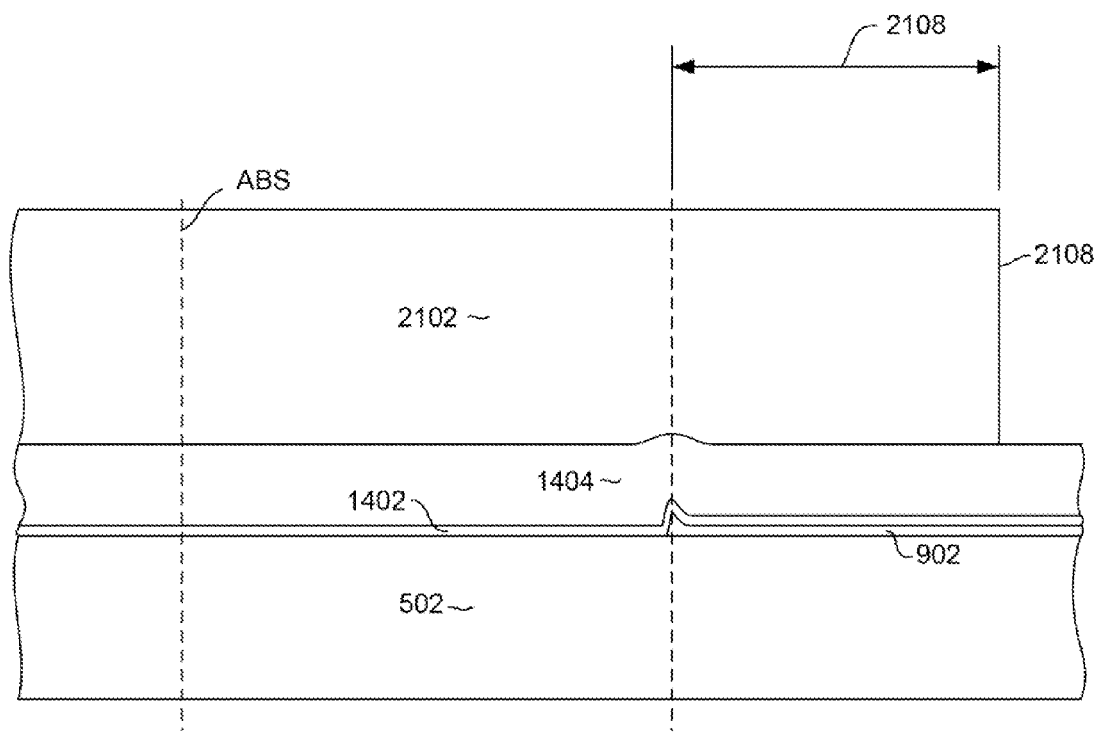

With reference now to FIG. 21, which shows a top down view, a third mask structure 2102 is formed. This third mask structure 2102 has an opening 2104 with an edge 2106 that is configured to define a back edge of the hard bias structure. Therefore, the edge 2106 is offset by an offset distance 2108 from the back edge of the sensor 504. FIG. 22 shows a side cross sectional view in the sensor region as seen from line 22-22 of FIG. 21, and FIG. 23 shows a side cross sectional view in the hard bias region as seen from line 23-23 of FIG. 21. As shown in FIGS. 22 and 23, the mask 2102 extends a distance 2108 from the back edge of the sensor 504. With the mask 2102 formed, a third ion milling process is performed to remove portions of the hard bias material 1404 that are not protected by the mask 2102 (FIG. 23) and portions of the fill layer 904 behind the sensor 504 that are not protected by the mask 2102 (FIG. 22).

If the sensor was constructed as a partial mill design as described above, then this ion milling will also remove the portion of the pinned layer structure that is exposed through the opening 2104 in the mask 2102. This will result in the pinned layer extending to the same distance as the hard bias layers (being self aligned therewith). On the other hand, if the sensor was constructed as a full mill design where the pinned layer does not extend beyond the free layer, then this ion milling will only be used to remove hard bias material.

Figure 24:
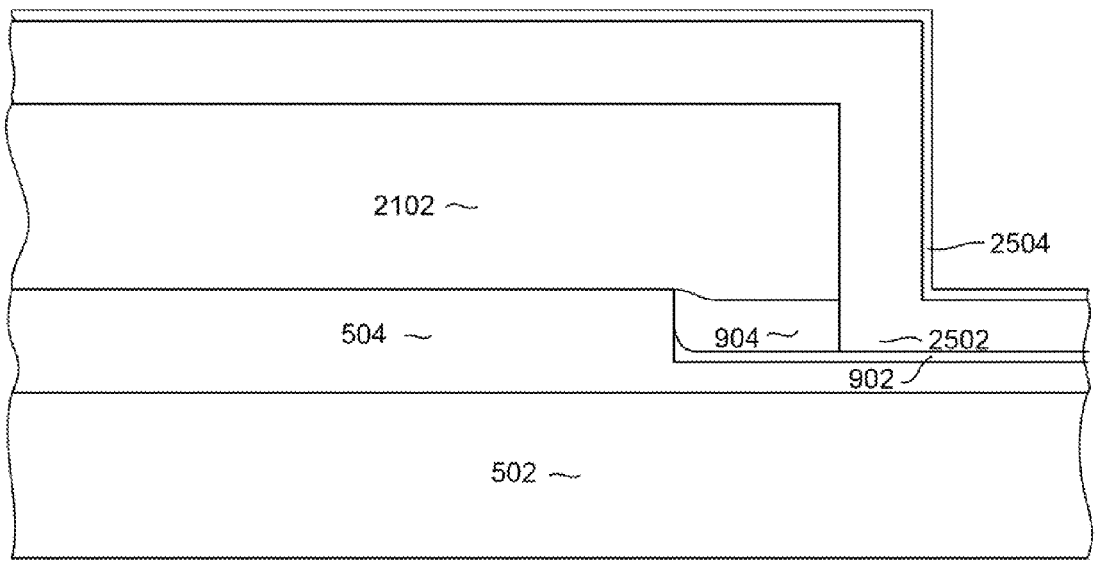
Figure 25:
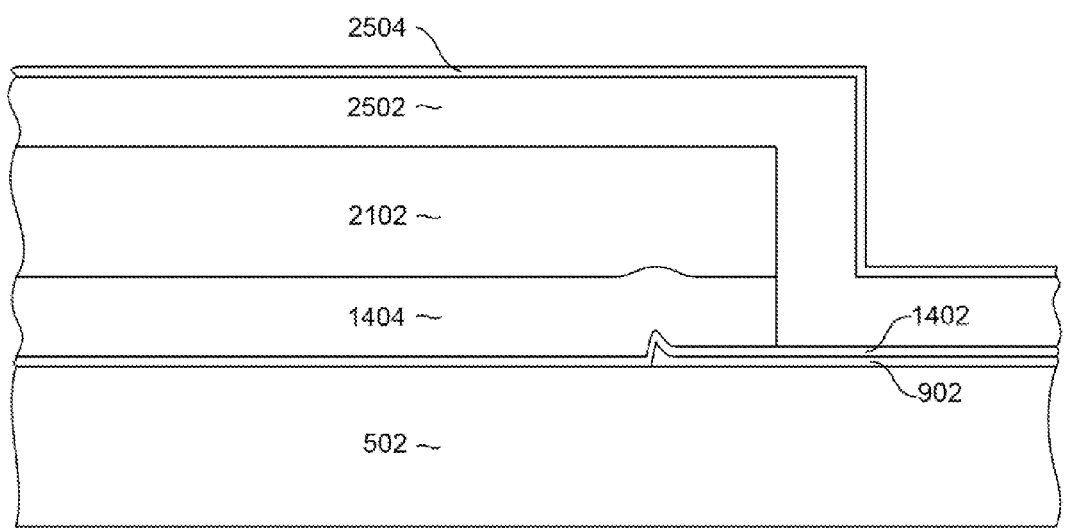

FIG. 24 shows a side cross sectional view in the sensor region (similar to FIG. 22) and FIG. 25 shows a side cross sectional view in the hard bias region (similar to FIG. 23). As shown in FIGS. 24 and 25, a nonmagnetic, dielectric fill layer such as alumina 2502 is deposited followed by a CMP stop layer 2504 formed of a material that is resistant to chemical mechanical polishing (CMP) such as diamond like carbon (DLC) or amorphous carbon. Both the fill layer 2502 and CMP stop layer 2504 can be deposited by a conformal deposition process such as atomic layer deposition, and the fill layer 2502 is preferably deposited to a thickness that is about level with the top of the sensor 504.

Figure 26:
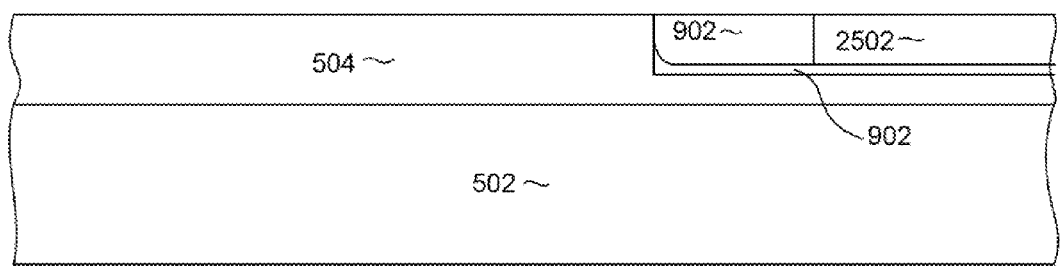
Figure 27:
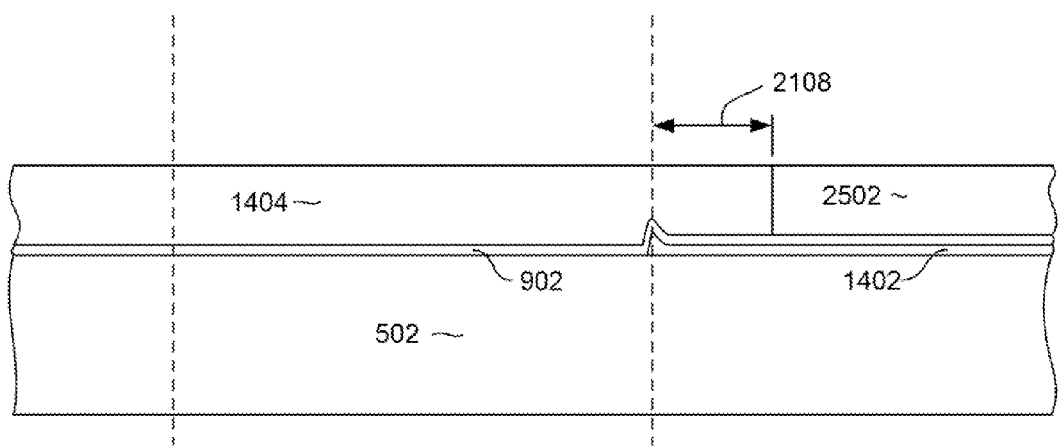

A chemical mechanical polishing (CMP) process can then be performed, leaving a structure such as shown in FIGS. 26 and 27. A reactive ion etching (RIE) can be performed to remove any of the remaining CMP stop layer 2504 (FIGS. 24, 25) if desired. Alternatively, a liftoff approach can be used to remove the mask 2102, and portions of the layers 2502, 2504 that extend over the mask 2102. This process can be useful for hard bias lengths or 200 nm or greater.

Figure 28:
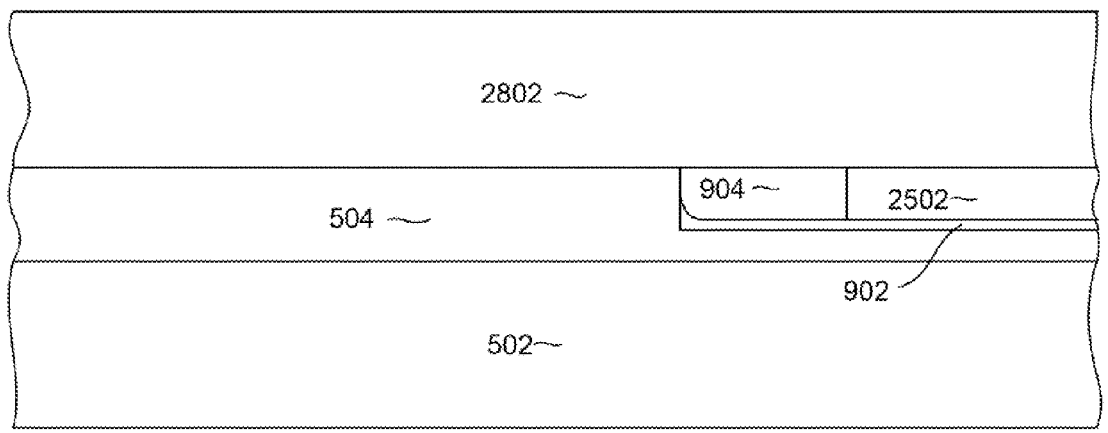
Figure 29:
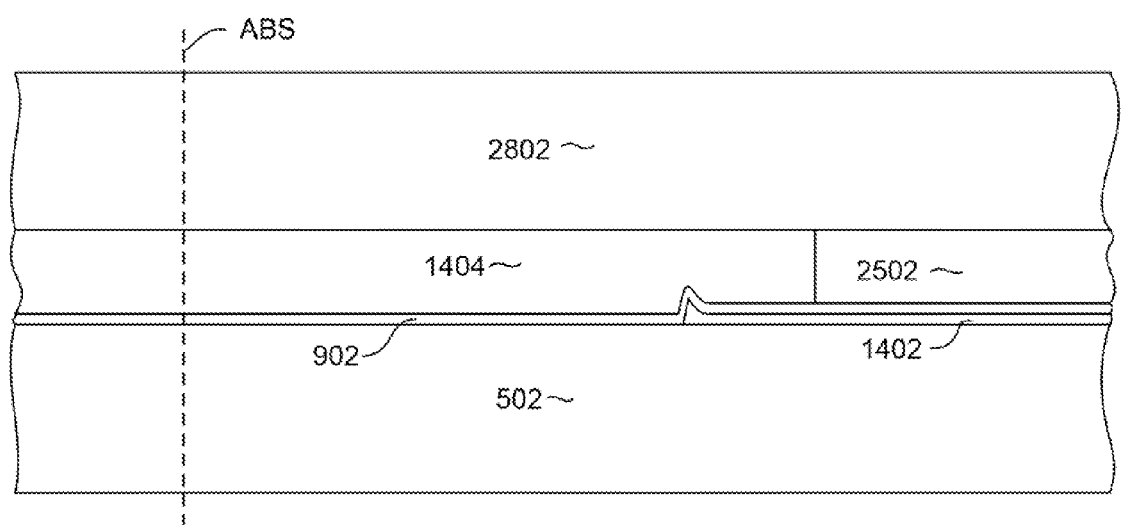
Figure 30:
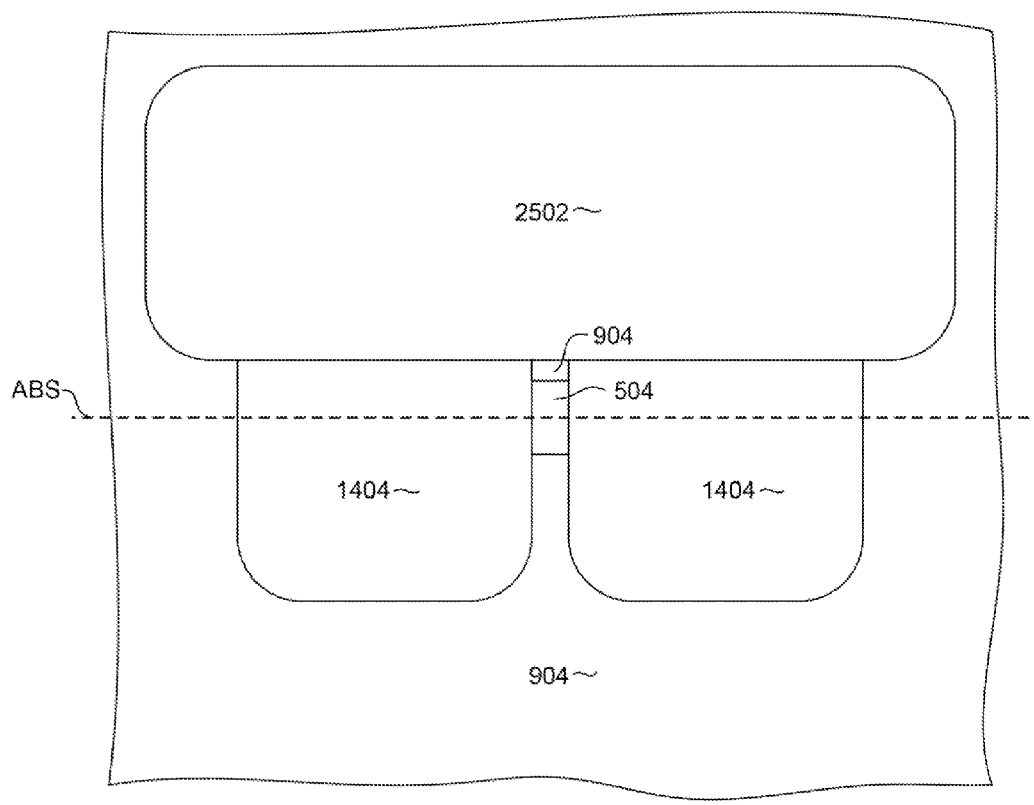

Then, with reference to FIGS. 28 and a top shield 2802 can be formed by electroplating an electrically conductive metal. FIG. 30 shows a top down view, with the shield 2802 removed, and shows the shape of the hard bias structures 1404 extending a desired distance beyond the back edge of the sensor 504.

It can be seen that the above described process can be used to construct a magnetic sensor wherein the magnetic hard bias layers extend a desired distance from the back edge of the sensor, and that this distance can be well controlled. In addition, the shape of the hard bias layers extending beyond the sensor can be formed with a well defined shape, especially at the innermost corners.

While various embodiments have been described above, it should be understood that they have been presented by way of example only and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A magnetic read sensor, comprising:
   a sensor stack having a front edge disposed at an air bearing surface and a back edge opposite the air bearing surface, the distance between the front edge and the back edge defining a sensor stack stripe height; and
   a hard bias structure formed adjacent to the sensor stack and having a back edge opposite the air bearing surface, the distance between the air bearing surface and the back edge of the hard bias structure defining a hard bias length, the hard bias length being greater than the sensor stripe height; and
   a bi-layer insulation structure formed behind the back edge of the sensor stack, the bi-layer insulation structure including a layer of material that is resistant to ion milling and a layer of material that has an ion milling rate that is about the same as an ion milling rate of the sensor stack.

2. The magnetic read sensor as in claim 1 wherein the hard bias structure has a straight back edge and a straight inner edge adjacent to the sensor stack.

3. The magnetic read sensor as in claim 1 wherein the back edge of the hard bias structure and an inner edge of the hard bias structure meet at a junction that is substantially square.

4. The magnetic read sensor as in claim 1 wherein the hard bias structure extends beyond the back edge of the sensor stack by a distance that is greater than 0 and no greater than 250 nm.

5. The magnetic read sensor as in claim 1 wherein the hard bias structure is separated from the sensor stack by a thin, non-magnetic, electrically insulating layer.

6. The magnetic read sensor as in claim 1 wherein the hard bias structure and the sensor stack is formed over a magnetic shield, and wherein the hard bias structure is separated from the sensor stack and from the magnetic shield by a first thin insulation layer, and further comprising a second insulation layer disposed between the hard bias structure and the magnetic shield only in regions where the hard bias structure extends beyond the back edge of the sensor stack.

7. The magnetic read sensor as in claim 6 wherein the first insulation layer comprises alumina.

8. The magnetic read sensor as in claim 6 wherein the second insulation layer comprises alumina.

9. The magnetic read sensor as in claim 6 wherein the first and second insulation layers both comprise alumina.

10. The magnetic read sensor as in claim 6 wherein both the first and second insulation layers are disposed between the hard bias structure and the magnetic shield in regions where the hard bias structure extends beyond the sensor stack and the second insulation layer is between the first insulation layer and the magnetic shield.

* * * * *